United States Patent Office 3,507,118
Patented Apr. 21, 1970

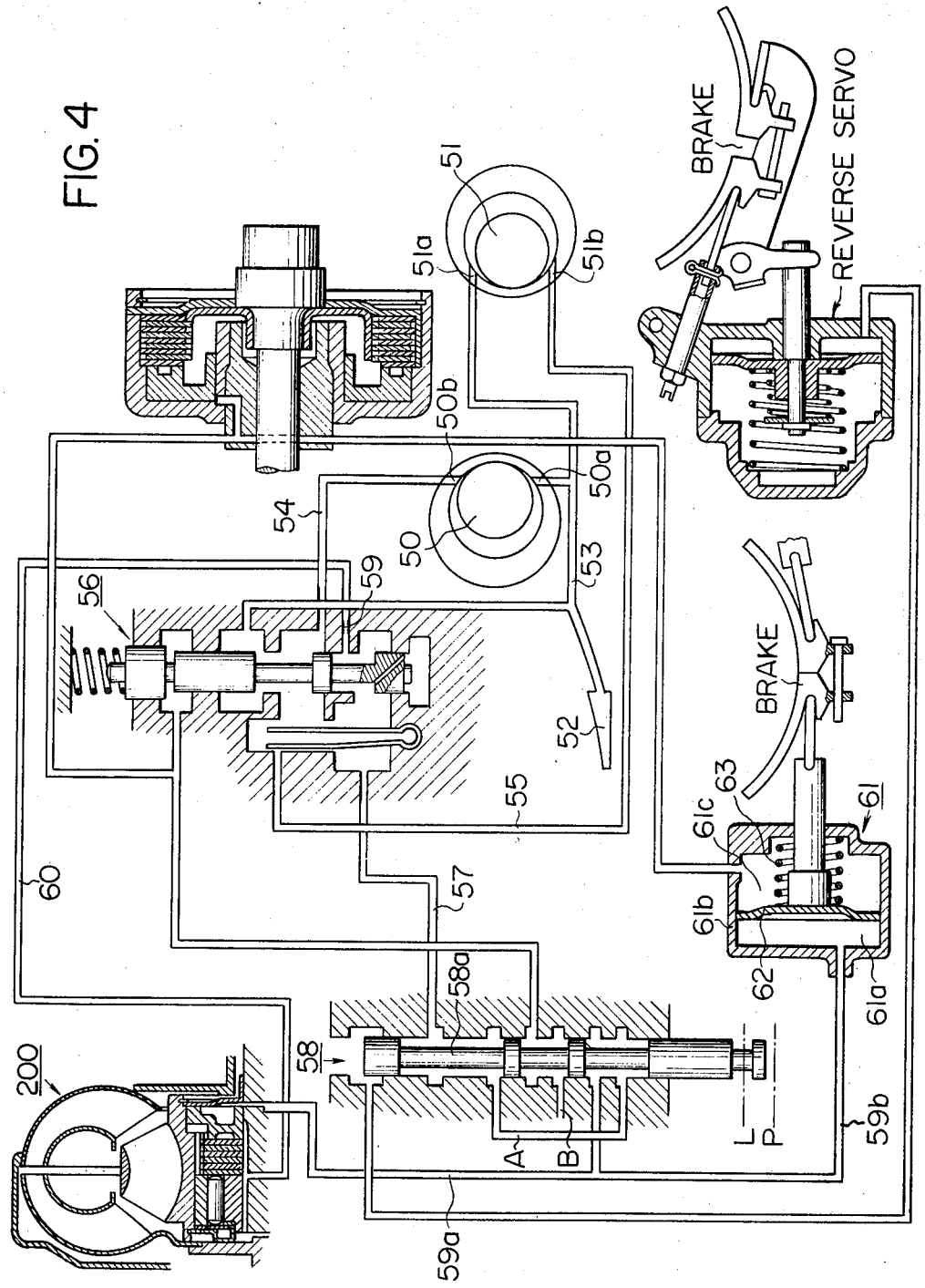

3,507,118
TORQUE CONVERTER ASSEMBLY
Hiroji Yamaguchi, Noboru Murakami, and Koichiro Hirozawa, Kariya-shi, Japan, assignors to Aisin Seiki Company Limited, Aichi-ken, Japan
Filed July 22, 1968, Ser. No. 746,558
Claims priority, application Japan, July 21, 1967, 42/47,009
Int. Cl. F16d 33/00, 31/06
U.S. Cl. 60—54                4 Claims

ABSTRACT OF THE DISCLOSURE

In a torque converter for automotive use including a drive part mechanically connected with an internal combustion engine, a pump impeller, a turbine runner, a stator wheel and a driven shaft, the improvement comprising the provision of a brake means adapted for holding the stator wheel in its stationary condition when a torque is transmitted inversely from the driven shaft to the drive part for increasing the fluid resistance to the circulating fluid through the working parts of the converter, thereby increasing the engine brake performance of the engine-converter combination.

---

This invention relates to a torque converter assembly, comprising a stationary casing, a drive part rotatably mounted in said casing and mechanically connected with an automotive internal combustion engine, a pump impeller rigidly coupled with said drive part, a turbine runner rotatably mounted in said casing and adapted for receiving a fluid flow discharged from said pump impeller, a stator wheel freely rotatable within said casing adapted for transmitting the fluid from said turbine runner to said pump impeller and a driven shaft rigid with said turbine runner.

It is the main object to provide an engine-converter combination having an increased braking performance when a torque is transmitted inversely from the side of the driven shaft through the converter to the engine side, by considerably increasing the fluid resistance circulating through the working parts of the converter.

A further object is to provide a fluid torque converter of the kind above referred to, which is simpler in its design and efficient in its performance.

Starting from the afore-mentioned known type of fluid torque converter assembly, the improvements proposed by the present invention in its broadest aspect comprises the provision of a mechanical brake means provided between said stator wheel and said stationary casing and operatable at the will of the driver of the automotive vehicle which is fitted with the engine-converter combination when he desires to initiate an engine-operated braking condition where a torque is transmitted inversely from the side of the driven shaft through the converter assembly to the engine side.

The mechanical brake means is advantageously built into a friction disc assembly which is on-off controlled hydraulically at the will of the driver.

In a certain modification of the invention, however, the desired effect can be automatically introduced into the converter when the torque is transmitted from the driven part of the converter to the drive part thereof, in place of the intentional actuation in the aforementioned sense.

These and further objects, features and advantages of the invention will become more clear upon reading the following detailed description in reference to the accompanying drawings constituting part of the present specification and illustrating several preferred embodiments of the invention given only for illustrating purpose, thus not as a definition of the invention.

In the drawings:

FIG. 4 is a schematic diagram illustrative of a preferred embodiment of the hydraulic circuit for control of the brake means employed in the torque converter assembly constructed in accordance with the invention.

It should be noted that throughout several figures of the drawings, the same reference numerals denote respective similar working parts irrespective of minor difference in their physical configurations.

Figure 1:
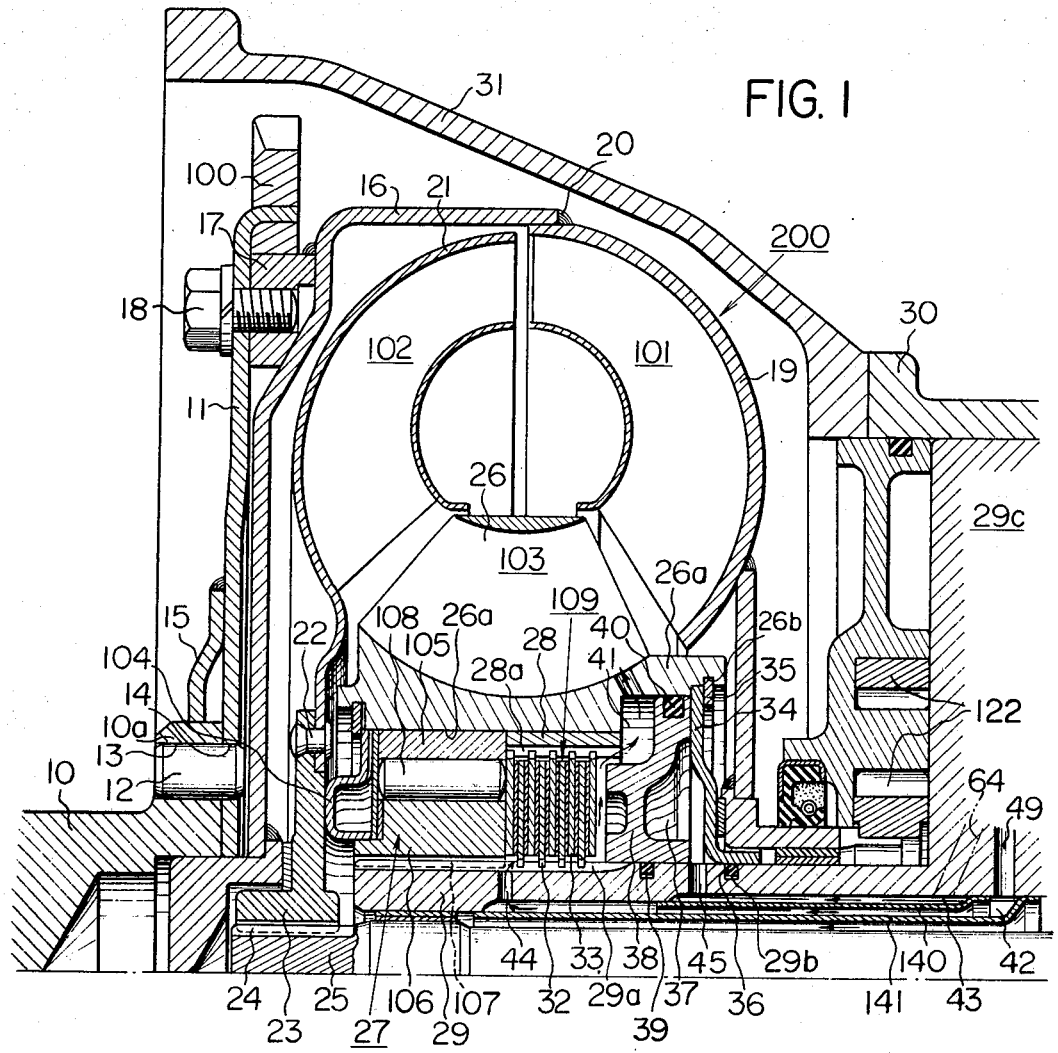
FIG. 1 is substantially a half of an axial and longitudinal sectional view of a torque converter embodying the principles of the invention.
Figure 2:
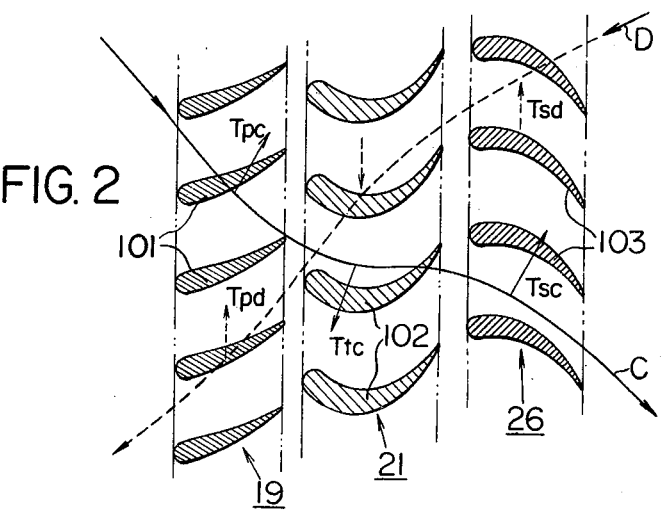
FIG. 2 is a schematic explanatory view of the torque converter shown in FIG. 1, illustrating the inside flow condition and the relative arrangement of the blades when the stator wheel of the converter is not fixed.

Referring now to FIG. 1, the numeral 10 denotes a crankshaft of an automotive internal combustion engine, not shown, said crankshaft being shown only a part thereof at its end extremity remote from the engine. A drive disk 11 is mounted rigidly on the crankshaft by means of a plurality of positioning pins radially arranged about the axis thereof, only one of which is shown at 12, and tightly passing through respective openings 13 and 14 formed through the radial flange 10a on the crankshaft and the drive disk 11. An auxiliary ring 15 is welded to the drive disk 11 for increasing its rigidity and avoiding any considerable deflection of the disk when the drive part of the hydraulic converter rotates.

A rotatable casing member 16 is provided with a plurality of tapped sleeves, only one of which is shown at 17, welded thereto. Fixing bolt 18 is screwed through the disk 11 into the threaded bore of the sleeve 17, thereby assuring a unitary rotation of the thus rigidly united members 11 and 16, a starting gear 100 adapted for being operated by a starting electric motor, not shown, being fitted rigidly to the disk 11.

A pump impeller 19 having a number of driving blades, generally shown at 101, is welded at 20 to the rotatable casing member 16.

A turbine runner 21 having a number of driven blades generally shown at 102 is riveted as at 22 to a hub member 23 splined at 24 to an input shaft 25 of a conventional auxiliary transmission gearing, not shown, said input shaft being arranged concentrically with the engine crankshaft 10. This input shaft constitutes the driven shaft of the torque converter assembly.

Stator wheel 26 having a plurality of fluid guide vanes generally shown at 103 is mounted on a conventional one way brake assembly 27 which is mounted in turn on a stator shaft 29, said brake being separated axially from the hub member 23 through a thrust washer assembly 104.

The brake assembly 27 comprises an outer sleeve 105 which is press-fit into the axial bore at 26a formed through the boss part of stator wheel 26. Toothed inner member 106 is splined at 107 to the stator shaft 29 and mounts a number of brake rollers 108. This conventional type one way brake assembly 27 is so designed and arranged that when torque is transmitted from the crankshaft 10 through the torque converter to the driven shaft 25, the brake 27 is engaged so that the stator wheel is kept stationary. This stationary condition of stator wheel is kept when the speed ratio between the pump impeller and the turbine wheel remains substantially within a specified range of 0.8–0.9. When the ratio exceeds 0.9, as an example, the fluid flow condition within the stator wheel is changed suddenly, and it is released from its choked condition and brought into its free rotating condition. This feature is, however, rather conventional. In a similar way, the wheel is freely rotatable under engine-braked conditions.

In close proximity to the one way brake assembly, there is provided a second brake assembly shown at 109. This brake assembly comprises an outer sleeve 28 again press-fit into the axial bore 26a of the stator wheel 26.

The stator shaft 29 is always kept stationary within a part 30 of the main housing generally shown at 31 of the torque converter assembly.

The one way brake 27 is rotatable in the same rotational direction of the automotive engine, as conventionally.

As shown, the shaft 29 is concentric with the shafts 10 and 25, all the necessary bearing means for these rotatable shafts having been omitted from the drawing for simplicity thereof. Within the friction brake 109, two series of friction disks 32 and 33 are provided in an alternate manner in such a way that the former disk series is kept in engagement with a plurality of outer parallel teeth 29a formed on the stator shaft, while the latter series of disks 33 is kept in engagement with a number of inner parallel teeth 28a formed on the inside wall surface of the outer brake sleeve for unitary rotation therewith.

It would be naturally conceivable to arrange the said brake assembly so as to have only a pair of cooperating friction disks.

The stator wheel 26 is formed at its boss with an insidely stepped cylindrical flange 26a, the right-hand end, FIG. 1, of which is closed by an end plate 34 kept in position between the inside wall surface of the cylindrical flange and the outer cylindrical surface of the stator shaft 29. There is provided a retaining spring clip 35 kept in position in a circular groove 26b formed in the inside wall surface of the cylindrical flange 26a, said spring clip backing up the end plate 34 from behind. For assuring a sealed contact between the end plate and the stator shaft, there is provided an O-ring 36 embeddedly mounted in a circular groove 29b formed in the stator shaft.

Within the stepped bore of the stator wheel closed by the end plate 34, there are provided hydraulic chambers 37 and 41 separated by a hydraulic piston 38 which is mounted axially slidable along and around the stator shaft, a second O-ring 39 being provided between the piston and the stator shaft and a third O-ring 40 being provided between the piston and the stator wheel, for assuring respectively an effective sealing relative to said piston. The left-hand end of the hydraulic chamber is defined at its opposite end remote from the piston by a friction brake plate assembly 32–33.

Within the inside hollow space of the stator shaft 29, there are concentrically mounted two pipes 140 and 141 separated a small radial distance from each other, thereby providing two oil passages 42 and 43 as shown.

The former passage 42 leads from an inlet passage 49 formed in the enlarged or main part 29c of the stator shaft, as appearing at the right-hand extremity of FIG. 1, to a radial bore 44 which is kept in fluid communication with the inlet side of the pump impeller 21, as shown by a series of successive small arrows in FIG. 1. The latter or outer oil passage 43 leads through a further radial bore 45 to the right-hand hydraulic chamber 37.

Next, referring to FIG. 4, a substantial part of the torque converter so far shown and described in the foregoing is shown generally at 200. Numeral 50 denotes a front oil pump which is arranged to be driven from the automotive engine, not shown. There is shown a rear pump 51 which is adapted to be driven from the output shaft of the transmission gearing, not shown.

When the both pumps 50 and 51 are operated, oil is sucked through a suction strainer 52 which is immersed in an oil reservoir tank, not shown, and a common suction piping 53 connecting said strainer with the respective inlets 50a and 51a, and delivered from respective pump outlets 50b and 51b through respective delivery pipings 54 and 55 to a conventional pressure regulator valve assembly 56. The oil thus regulated in its pressure to a predetermined line pressure is delivered through a connecting piping 57 to a manual shift valve assembly 58. Oil is further delivered from the regulator valve assembly 56 through a pressure-reducing orifice 59 provided in a connecting piping 60 which leads to the inlet passage 49 shown in FIG. 1.

When a manual control lever, not shown, is manipulated to its low speed position, the valve member 58a is brought into its position shown in FIG. 4, thereby the piping 57 being brought into fluid communication with connecting pipings 59a and 59b through connecting duct A as shown. Therefore, oil regulated at the line pressure is delivered through the piping 59b into the inlet chamber at 61a of a low speed actuator 61, thus urging a piston 62 slidably arranged in the casing 61b of the actuator to move in the right-hand direction in FIG. 4 against the action of spring 63. The interior space of said casing 61b comprises two hydraulic chambers 61a and 61c. Although not shown, the automotive vehicle fitted with the torque converter arrangement so far shown and described is caused to run at a low speed when the actuator 61 is operated in the aforementioned manner.

On the other hand, oil is delivered through the piping 59a which is kept always in fluid communication with a duct 64 (FIG. 1) formed through the main part 29b of the stationary shaft, to the outer oil passage 43, thence to the hydraulic chamber 37.

When pressurized oil is thus delivered to the chamber 37, piston 38 is urged hydraulically to move in the left-hand direction in FIG. 1, thereby both series of friction disks 32 and 33 being brought into pressure contact so as to bring the brake into its engaged position and the stator wheel 26 being brought into rigid mechanical connection with the stationary stator shaft 29 and thus prevented from its rotation. In effect, the stator wheel is rigidly connected with the stationary housing part 30.

Figure 3:
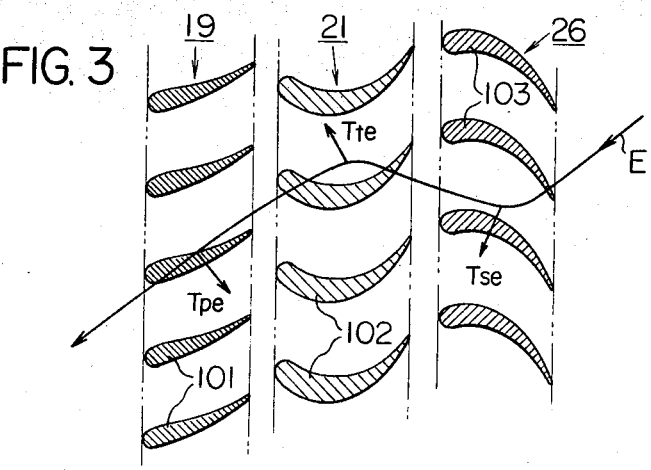
FIG. 3 is a similar view to FIG. 2, when the stator wheel is kept stationary by means of a brake means which constitutes a main feature of the invention.

When the engine operated brake system is actuated under these operating conditions, the fluid flow passage appearing in the interior of the converter will take the flow path shown at "E" in FIG. 3 in a representative and schematic way.

In this case, torque is transmitted inversely from the driven side to the drive side of the converter. Therefore, the turbine runner is driven from the otherwise driven shaft 25 through several parts 24, 23 and 22. The oil delivered by the turbine blades 102 of turbine 21 is supplied into the pump impeller 19 so as to drive the blades 101, thereby rotation being transmitted from the impeller through several parts 20, 16, 17, 18, 11 and 12 to the crankshaft 10 and thus driving the automotive engine. The outgoing hydraulic fluid from the blade spaces between a series of pump blades 101 is then conveyed into the stator wheel 26, flowing through the inter blade spaces of the now stationary blades 103 and exerting thereby a torque such as shown in FIG. 3 at $T_{se}$ which torque acts in substantially the same direction as the turbine runner rotation. In this case, the one way brake is kept in its released position, but the friction brake is kept in its engaged position, as was described in the foregoing. Therefore, the stator wheel is kept in its stationary position and therefore the fluid having been guided by its blades 103 will exert a torque upon the turbine runner blades 102 as that shown in FIG. 3 at $T_{te}$ which acts in the opposite direction to the rotation of the turbine which is subjected to a considerably increased braking effort. Under these operating conditions, therefore, wherein engine-operated braking is being performed, the braking effort will be substantially accentuated than in the conventional system.

When it is desired to return the hydraulic piston from the presently working position to the right-hand or non-working position shown in FIG. 1 so as to release the friction brake, the hydraulic pressure prevailing in the converter is utilized.

For this purpose, valve 58 which is normally linked with a conventional automotive gear change lever, is lowered from the position L to P in FIG. 4, pressure oil is discharged from chamber 37 through port 45, duct 49, passage 59a and port B.

Figure 5:
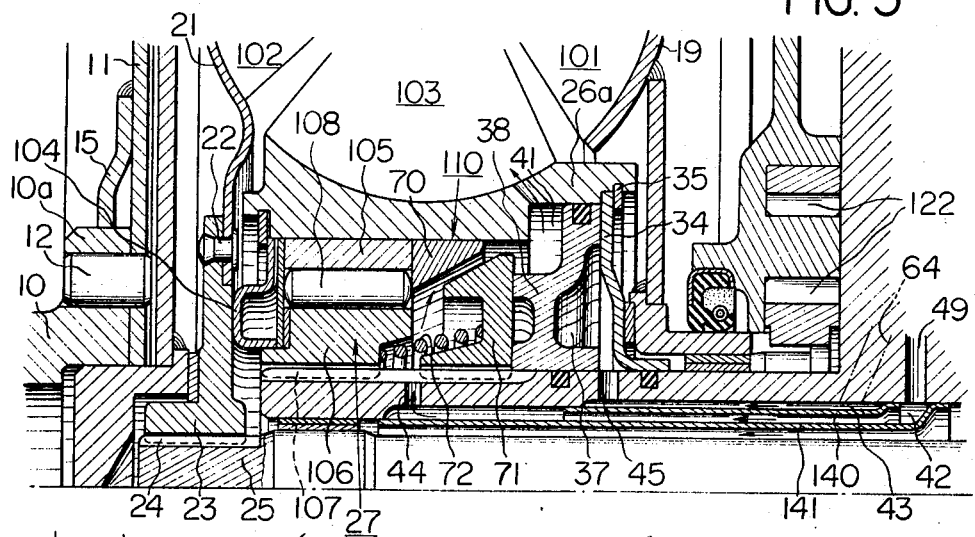
FIGS. 5 and 6 are respective halves of the longitudinal axial sectional views of modified arrangements of the torque converter embodying the principles of the invention.
Figure 6:
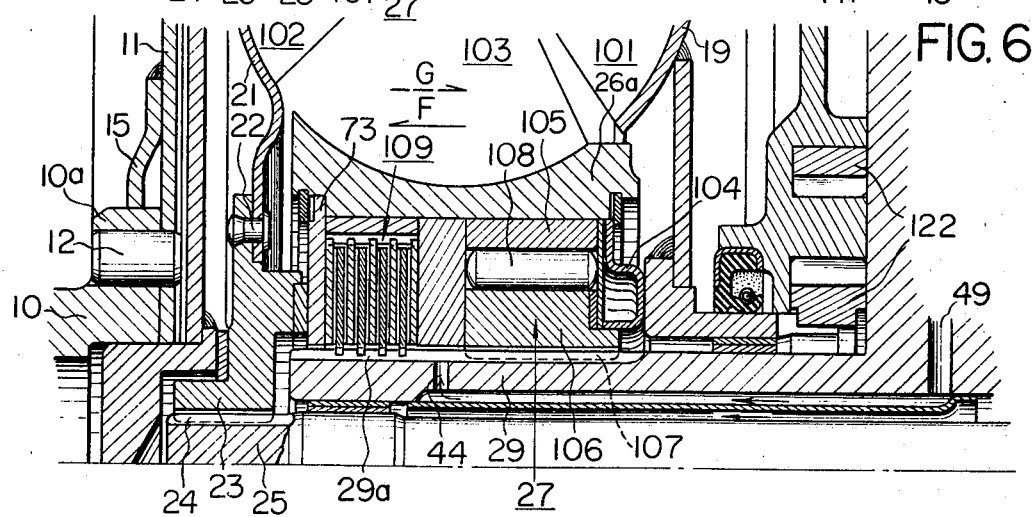

In FIGS. 5 and 6, two modifications from the foregoing are shown. In these figures, similar parts are shown by same reference numerals as before.

In the modified arrangement shown in FIG. 5, the friction brake assembly 109 in the foregoing embodiment was replaced by a cone brake assembly shown generally at 110, comprising an outer cone member 70 fixedly attached to the stator wheel. An inner brake cone 71 is splined to the stator shaft. A return spring 72 is inserted under compression between the inner and stationary brake member 106 of the neighboring one way brake assembly and the hydraulic piston 38. The operation will be easily understood from the foregoing without further analysis. The return movement of the hydraulically operated piston 38 is performed by the urging action of the return spring 72 exerted thereupon through the inside and longitudinally slidable brake cone 71, in place of the hydraulic working pressure utilized in the foregoing embodiment.

In the still further modified arrangement, the hydraulically operated piston 38 has been omitted and the one way brake and the friction disks have been exchanged in their axial arrangement with each other. By this provision, a friction engaging pressure shown by an arrow F in FIG. 6 will be exerted by the stator wheel through a pressure plate 73 rigidly attached thereto onto the brake disks. Therefore, the stator wheel is kept in its stationary position as before.

On the other hand, when torque is transmitted from the engine side, the above mentioned hydraulic brake engaging pressure is released, because in this case the hydraulic reaction acting on the stator wheel will direct in the opposite sense, as shown by a dotted arrow G.

While specific embodiments of the invention have been shown and described in detail to illustrate the application of the invention principles, it will be understood that the invention may be embodied otherwise without departing from such principles.

What we claim is:

1. In an automotive torque converter assembly comprising a driving shaft, a drive part fixedly connected thereto, a pump impeller fixedly connected to said drive part for being driven thereby, a turbine runner adapted for receiving a fluid flow discharged from said pump impeller, thereby said runner being driven thereby, a driven shaft, a stator wheel rotatably mounted on a stationary shaft and adapted for guiding the fluid flow discharged from said runner into said pump impeller, said driven shaft being rotatably arranged relative to said stationary shaft and rigidly connected with said turbine runner, and a one way brake provided between said stator wheel and said stationary shaft for letting said stator wheel rotate freely when torque is transmitted from the engine side, the improvements comprising the provision of a second brake assembly provided between said stator wheel and said stationary shaft for choking the stator wheel from rotation when torque is transmitted from the driven shaft.

2. Torque converter assembly as set forth in claim 1, wherein said second brake assembly is of the friction disk type.

3. Torque converter assembly as set forth in claim 1, wherein said second brake assembly is of the automatic type adapted for receiving a brake-engaging axial force when the engine is driven from the driven side.

4. Torque converter assembly as set forth in claim 1, wherein the second brake is of the cone disk type.

References Cited

UNITED STATES PATENTS

| 3,180,095 | 4/1965 | Schneider | 60—54 |
| 3,300,971 | 1/1967 | Qualman et al. | 60—54 |
| 3,307,428 | 3/1967 | General | 60—54 XR |
| 3,370,425 | 2/1968 | Au | 60—54 |

EDGAR W. GEOGHEGAN, Primary Examiner